Jan. 9, 1945.  H. J. SHERRILL  2,366,937
AIR BRAKE VALVE
Filed Dec. 4, 1941  2 Sheets-Sheet 2
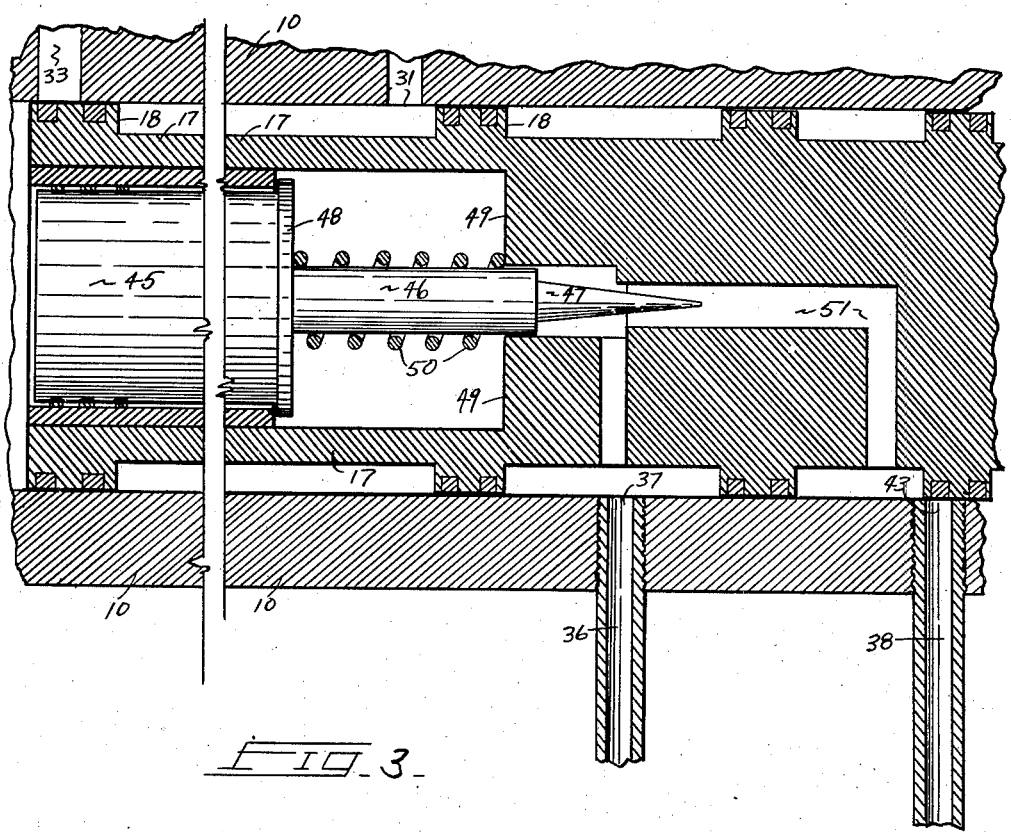
Harry J. Sherrill
Inventor
By W. B. Harpman
Attorney Patented Jan. 9, 1945

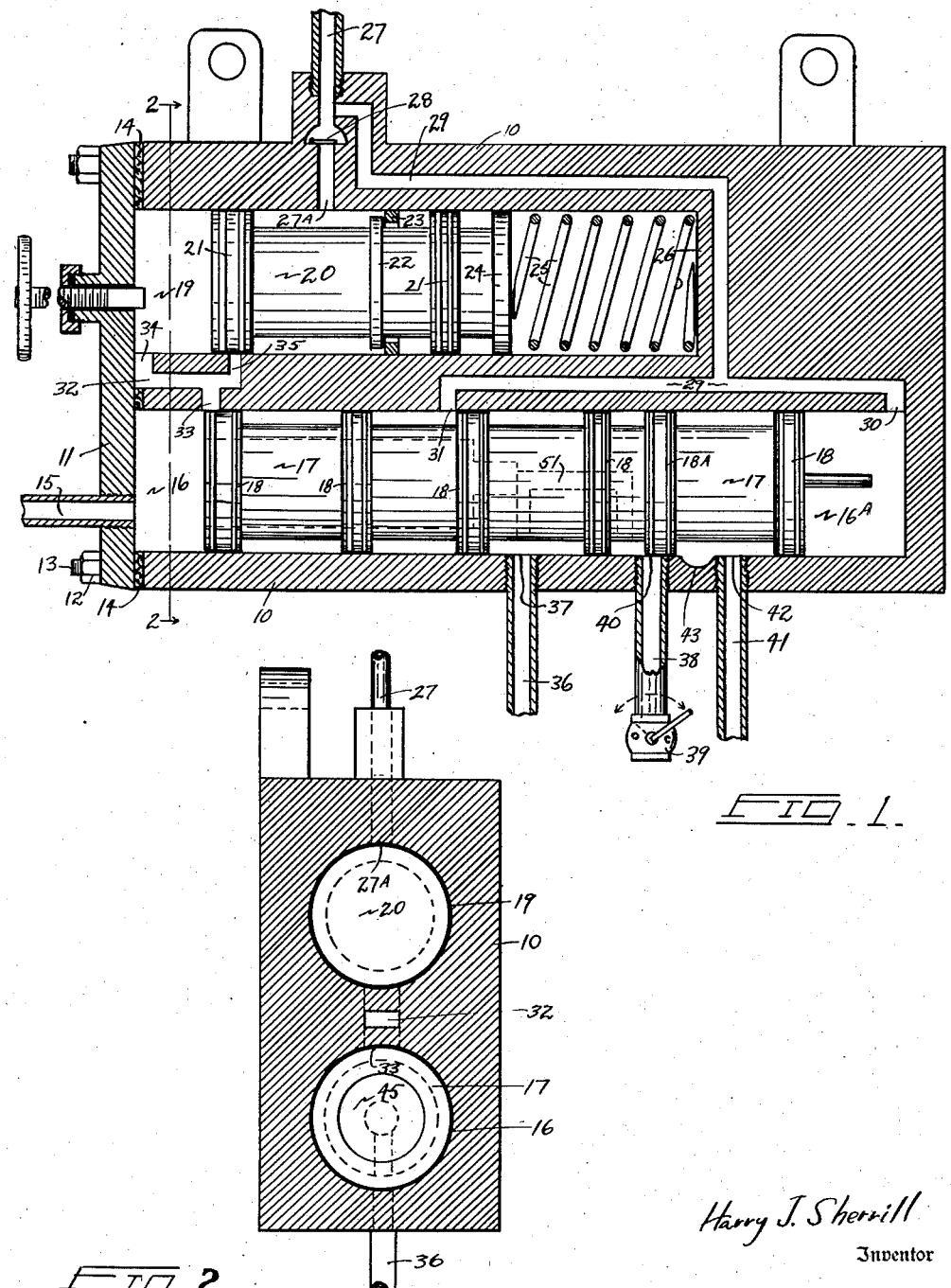

2,366,937

UNITED STATES PATENT OFFICE 2,366,937

AIR BRAKE VALVE

Harry J. Sherrill, Youngstown, Ohio

Application December 4, 1941, Serial No. 421,581

8 Claims. (Cl. 303—65)

This invention relates to an air brake and more particularly to an improved and simplified form of air brake valve.

The principal object of the invention is the provision of an air brake valve intended for installation upon each car of a train and which will upon a variance of air pressure in the train brake pipe control the application or release of the brake in cooperation with the brake cylinders.

A further object of the invention is the provision of an air brake valve which will permit the auxiliary reservoirs of a train to be recharged without exhausting the brake cylinders of the cars of the train.

A still further object of the invention is the provision of a brake valve so designed that a portion thereof forms a uniform brake release valve so that despite the length of a train and the difference in air pressure at the opposite ends of the train brake pipe, the brakes of the train may be uniformly released and thus avoid undesirable movement of portions of the train.

A still further object of the invention is the provision of a brake valve in which the essential brake cylinder controlling portions thereof are moved solely by variance of air pressure in the train brake pipe and in the brake valve itself and the auxiliary reservoir to which it is connected.

The brake valve shown and described herein has been designed so that it may be used in conjunction with standard brake valve equipments now known to the art and commonly found in use on railroad equipment. It is primarily different from the valves heretofore known in the art in that it is a great deal simpler in construction and further depends for its essential control of the air to and from the brake cylinders, upon a movable slide valve controlled solely by a variance of air pressure between the auxiliary reservoir, the train brake pipe and the brake cylinder.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed without departing from the spirit of the invention.

The invention is illustrated in the accompanying drawings, wherein:

Figure 1 is a side elevation with parts in cross-section illustrating the improved brake valve and showing the various connections essential thereto, the valve is illustrated in lap position which is the same as recharging position.

Figure 2 is a cross-sectional end elevation taken on lines 2—2 of Figure 1 and shows a relative positioning of parts of the improved brake valve.

Figure 3 is an enlarged detail illustration with parts broken away showing a portion of the mechanism illustrated in Figures 1 and 2.

By referring to the drawings and Figure 1 in particular, it will be seen that the brake valve comprises a suitable casing 10 preferably formed of metal and having various openings and passageways machined therein. An end plate 11 is provided and is attached to the casing 10 by means of a plurality of nuts 12 functioning with a matching plurality of threaded shafts 13 which are in turn attached directly to the casing 10. It will be observed that a suitable gasket 14 is positioned between the end plate 11 and the casing 10 and it will also be seen that a branch pipe 15 which communicates with the train brake pipe (not shown) also communicates with the interior of the brake valve and particularly with a chamber 16 immediately inside of the end plate 11 through which the branch pipe 15 extends.

By referring to Figures 1 and 2 of the drawings it will be observed that the chamber 16 is in effect a cylinder formed in the lower portion of the valve casing 10 and that it has slideably positioned therein a main control piston 17 which is provided with a plurality of annular enlarged areas 18 which in turn are provided with annular packing rings to insure airtight contact with the walls of the chamber 16 which is cylindrical in form. The areas between the enlarged annular areas 18 will be seen to provide for the passageway of air about the main control piston 17 which air is controlled as to entering or leaving ports in the chamber 16 by the blocking action of the annular enlarged areas 18.

Centrally located with respect to the valve casing 10 and immediately above the chamber 16 there is a secondary cylindrical chamber 19 in which is slidably positioned an auxiliary reservoir governing piston 20 which is similar in form to the main control piston 17 already described and which is provided with a plurality of annular enlarged areas 21 which in turn are provided with suitable packing rings. In addition, the piston 20 is provided with an annular shoulder 22 which is adapted to engage a blocking ring 23 formed on the inner walls of the chamber 19 and intended to prevent the movement of the piston 20 past the same.

The innermost end of the piston 20, with respect to the valve casing 10, is enlarged and serves as an abutment 24 against which a calibrated spring 25 is positioned, the opposite end of the spring 25 resting against the innermost end 26 of the chamber 19. It will thus be seen that normal tendency of the auxiliary reservoir governing piston 20 is to move toward the end plate 11 urged by the spring 25.

An auxiliary reservoir (not shown) communicates with the chamber 19 by means of a pipe 27 and a port 27A it being noted that a check valve 28 controls the passageway between the port 27A and the pipe 27 leading to the auxiliary reservoir and while it permits air to move to the reservoir through the pipe 27 it prevents air from the reservoir re-entering the port 27A. In this connection, it will be seen that a passageway 29 communicates with the pipe 27 immediately above the check valve 28 and establishes communication with the extreme right end 16A of the chamber 16 and also, by means of a branch, establishes communication with a port 31 positioned midway between the ends of the chamber 16 and it will be noted that the port 31 is located between two of the annular enlarged areas 18 of the main control piston 17.

By referring again to the ends of the chambers 16 and 19 adjacent the end plate 11, it will be seen that a Y-shaped passageway 32 communicates with the chamber 16 by means of a port 33 and with the chamber 19 by means of ports 34 and 35. The port 33 being subject to control by one of the annular enlarged areas 18 of the main control piston 17 while the port 35 is subject to control by one of the enlarged areas 21 of the auxiliary reservoir governing piston 20.

In order that air introduced into the brake valve may eventually reach the brake cylinder (not shown) a brake cylinder pipe 36 communicates with the chamber 16 by means of a port 37 as do two other pipes, one of which is indicated by the numeral 38 and provided with a cock 39 and which forms the standard exhaust, communicating with the atmosphere, it being observed that a port 40 through which it communicates with the chamber 16 is subject to control by one of the annular enlarged areas 18 of the piston 17. The other one of the two pipes is indicated by the numeral 41 and communicates with the chamber 16 by way of a port 42 and is open to the atmosphere at its other end. This pipe 41 is an improved feature as its exhausting operation is automatic due to the presence of a by-pass 43 formed in the wall of the chamber 16 and which effectively permits the flow of air around the controlling portion of the piston 17 which comprises the annular enlarged areas 18 immediately adjacent thereto. In Figure 3 of the drawings an enlarged cross-sectional elevation with parts broken away illustrates the interior of the main control piston 17 which as has heretofore been noted is slideably mounted in the chamber 16. The construction set forth in Figure 3 of the drawings comprises the structure of the uniform release piston valve or needle valve which is provided so that the brakes on cars on opposite ends of a long train may be released simultaneously and the braking action of the train thus equalized. The uniform release mechanism comprises the assembly of a piston 45, piston rod 46 attached thereto and a needle valve 47 formed as a part thereof. A large annular shoulder 48 is also formed on the piston rod 46 and together with shoulders 49 formed within the body structure of the main control valve piston 17 form opposed surfaces between which is positioned a calibrated spring 50. Still referring to Figure 3 it will be observed that a passageway 51 is formed within the piston 17 and is subject to the control of the needle valve 47. Having thus described the structural details, the following is a description of the mode of operation of the valve of the invention. By referring again to Figure 1 of the drawings, it will be observed that when air under pressure is introduced into the chamber 16 by way of the branch pipe 15 it will cause the main control piston 17 to move away from the end plate 11 and thus expose the port 33 which permits the air to flow through the passageway 32 and into the chamber 19 through both of the ports 34 and 35, the piston 20 having been urged toward the end plate 11 by the spring 25 thus permitting the air to enter the chamber 19 through the port 35 and at the same time permit the air entering through the port 35 to flow around the piston 20 and out of the chamber 19 through the port 27A lifting the check valve 28 and flowing through the pipe 27 into the auxiliary reservoir (not shown) and thus establishing an air pressure in the same equal to that introduced into the chamber 16 until a predetermined pressure, for example 70 pounds, has been reached at which time the air in the chamber 19 will move the piston 20 against the coiled spring 25 and cause the annular enlarged areas 21 thereof to effectively block the port 35. Before this occurs, however, it will be noted that the air leaving the chamber 19 through the port 27A can and does flow through the passageway 29 and the branches thereof to the opposite end 16A of the chamber 16 entering there through the port 30 and tending to equalize the pressure on the opposite ends of the piston 17 and at the same time flowing through the other branch of the passageway 29 through the port 31 which is midway between the ends of the chamber 16. The air entering the chamber 16 through the port 31 is confined in the chamber 16 between the enlarged annular areas 18 formed on the piston 17, a pair of the same being located on either side of the port 31. The system is now charged and normal pressure maintained, the brakes being not applied.

It will be seen that in order to apply the brakes, it will be necessary to permit air from the auxiliary reservoir under pressure to flow into the brake cylinder pipe 36 which communicates with the chamber 16 by way of the port 37. An engineer, making a standard brake application by brake pipe reduction, reduces the air pressure in the train brake pipe with the corresponding reduction of the pressure in the chamber 16. As the check valve 28 is seated, the air in the auxiliary reservoir in communication with the pipe 27 and hence the passageway 29 and hence the chamber 16A remains at normal pressure and, therefore, moves the main control piston 17 toward the end plate 11 thus causing the port 31 to be brought into communication with the port 37 which in turn opens into the brake cylinder pipe 36 and thus permits the air in the auxiliary reservoir (not shown) to flow into the pipe 27, into the passageway 29, across the chamber 16 and through the pipe 36 to the brake cylinder, thus causing the brakes to be applied. In order to recharge the auxiliary reservoir while the brakes remain set, which can be accomplished with this improved valve, it is only necessary for the engineer to place the brake valve on the engine, which has been on lap position after the reduction made, to either holding or running position which starts the recharging action and thus increases the air pressure in the chamber 16 and causes the main control piston 17 to move toward the chamber 16A and open the port 33 which permits the air to flow upwardly through the port 35 around the piston 20 and through the pipe 27 into the auxiliary reservoir. When the pressure in the auxiliary reservoir reaches normal, which is the calibrated strength of the coil spring 25, the piston 20 will close the port 35 and thus govern the pressure within the auxiliary reservoir and insure against charging the same to an excessive pressure. It will be seen that when the main control piston 17 moves to open the port 33, as just described, it does not simultaneously open the brake cylinder pipe 36 to the atmosphere as it does not move far enough. This action is insured as the air in the chamber 16A equalizes in pressure with that in the chamber 16 and thus adequately prevents too great a movement on the part of the piston 17. Thus the auxiliary reservoir is recharged to normal and the brakes, remain set. This action is unique with this valve as it permits the recharging of the reservoirs while the brakes are set. In other valves known to the art, the valve must move to release position and release the brakes before the auxiliary reservoirs can be charged from the train brake pipe. It will be seen that the valve, the subject of this invention, thus passes through the standard brake positions as follows: in application piston 17 moves to permit the port 31 to communicate with port 37 and thus enables air to flow from the auxiliary reservoir to the brake cylinder. When the pressures approximately equalize in the chambers 16 and 16A on either ends of the piston 16, the valve automatically moves into lap position, the engineer having moved the main control valve in the engine into lap position to await the brake application, it being necessary to retain the control valve in lap position only long enough to permit the brakes to be applied in accordance with the reduction made. The main control valve may then be moved immediately to holding or running position and recharging undertaken. In release position, it will be seen that in order to release the brakes the pressure in the train pipe is increased to a level above normal pressure hereinabove referred to, which will cause the main control piston 17 to move toward the chamber 16A and this cause the annular enlarged area 18A to expose the by-pass 43 formed in the wall of the chamber 16 which permits the air to flow from the brake cylinder pipe 36 through the by-pass 51 in the piston 17 around the enlarged annular area 18A and out through the improved exhaust 41 by way of the port 52. It will be seen that in this described operation the cocks 39 are closed and the release of the brakes always makes use of the by-pass 43 and the improved exhaust pipe 41 which communicates with the atmosphere. In mixed trains, however, in order to provide uniform operation, as when these improved valves may be used on some of the cars of the train and other air brake valves are used on other cars, then the cocks 39 are left open and the braking action takes place as in any standard air brake, releasing the brakes by permitting the air to pass through the pipe 36 from the brake cylinder, the passageway 51 in the piston 17 and to atmosphere through the pipe 38, the enlarged annular area 18A on the piston 17 having opened the port 40.

It will be seen that when the cocks 39 are open the brakes will release before the recharging action can be accomplished. It will be noted that the auxiliary reservoir governing piston 20 always operates and thereby prevents the establishment of excessive pressures in the auxiliary reservoirs and thus insures the availability of an operating differential between the reservoirs and the train pipe pressures.

Successive applications of the brakes may be made as desired by successive reductions of the pressure in the train pipe each time causing the main control piston 17 to move back and forth and deliver air from the auxiliary reservoir by way of the pipe 27 to the brake cylinder by way of the brake cylinder pipe 36. The piston 17 automatically moving back and forth and thus balancing when the pressure is approximately equalized on the opposite ends thereof each movement opening or closing the admission or exhaust ports concerned.

It will be observed that the by-pass 51 through which the air must flow from the brake cylinders to either of the exhausts, is illustrated in detail in Figure 3 and has heretofore been described structurally. It will be noted that under the operating conditions heretofore set forth the piston 45 and the needle valve 47 effecting a partial control of the air flowing through the by-pass 51 will be inoperative and that in order to cause the same to operate pressures in excess of those normally used must be applied to the chamber 16 from the train pipe. For example, in the case of a long train wherein it is highly desirable that the brakes be uniformly released throughout the length of the train, it is only necessary to apply a higher pressure, to the train brake pipe. This will immediately be applied to the chamber 16 in each of the valve cylinders in the front portion of the train which will cause the piston 45 to move the needle valve 47 partially into the by-pass 51 and thus permit the air from the brake pipe 46 to flow very slowly therethrough and thus cause a slow release of the brakes on the front part of the train. As the air pressure on a long train in the train pipe is unequal, the lower pressures normally existing on the back cars of the train will not cause the uniform release mechanism, which comprises the piston 45 and the needle valve 47, to operate and the brakes will therefore, be released normally. The net result being that the brakes on the entire train release uniformly. It will be observed that the coil spring 50 in the uniform release mechanism must be able to oppose a higher than normal pressure in order that this device may function as specified.

The air brake valve has several points of novelty not found in other brake valves known to the art. Among these are its capabilities of permitting recharging of the auxiliary reservoir prior to releasing the brakes and therefore at the same time as the brakes are set. This action contributes to safety of operation as the engineer may always be certain of fully charged reservoirs, therefore, adequate pressure differential for brake application. With standard brake valves, an engineer finding it necessary to make successive brake applying reductions often finds it impossible to properly control the train and at the same time permit adequate recharge of the reservoirs. This danger is completely avoided by the present structure. In the case of a long train upon a long and sharp down-grade the maximum initial brake application possible may be made, and while the brakes remain set and the train still traveling down-grade the reservoirs may be recharged and additional pressure built up in the brake cylinders from the recharged reservoirs. This action itself will permit the faster handling of trains on grades as it will not be necessary to stop the train and make manual adjustments of the retainers in order to insure adequate control of the train as is the present custom.

Having thus described my invention, what I claim is:

1. An air brake adapted to be used in connection with a source of air supply, an auxiliary reservoir and an air brake cylinder and adapted to control the flow of air therebetween and comprising a body member having a primary cylinder and a secondary cylinder formed therein, a primary piston valve slidably positioned in the said primary cylinder and a spring opposed secondary piston valve slidably positioned in the secondary cylinder, the said source of air supply communicating with one end of the said primary cylinder, passageways formed between the said cylinders, a passageway communicating with the said secondary cylinder and with the said auxiliary reservoir and subject to control by the said spring opposed secondary piston valve, a communication channel extending from the said auxiliary reservoir to the said primary cylinder and communicating therewith through two orifices one of which is located midway in the said cylinder and the other one of which communicates with the end of the said primary cylinder opposite the end thereof in communication with the source of air supply, a plurality of enlarged annular areas formed on the said primary piston valve, a communication channel establishing communication with the said air brake cylinder and with an orifice midway in the said primary cylinder, and a pair of exhaust communication channels communicating with the said primary cylinder and the atmosphere, one of which channels is provided with valve means, a by-pass formed in the said primary piston valve and by-passing one of the said enlarged annular areas formed thereon so that air from the brake cylinder may flow therethrough and reach one of the said exhaust channels subject to the positioning of the said primary piston valve in the said primary cylinder.

2. The combination in an air brake valve adapted to be used in connection with a source of air supply, an auxiliary reservoir and an air brake cylinder, of a primary piston valve and a secondary piston valve, the said primary piston valve adapted to be controlled by a variance of air pressure between the said auxiliary reservoir and the said source of air supply, the said primary piston valve adapted to control communication channels between the said auxiliary reservoir and the said air brake cylinder and control communication channels between the said air brake cylinder and a pair of exhaust channels, a spring opposing the said secondary piston valve and adapted to permit the same to close a communication channel between the said source of air supply and the said auxiliary reservoir upon the latter's reaching a predetermined pressure, together with valve means on one of the said exhaust channels.

3. In an air brake valve adapted to be used in connection with an air supply source, an auxiliary reservoir and a brake cylinder, a primary cylinder formed therein, a primary piston valve movably positioned in the said primary cylinder, a plurality of enlarged annular areas formed on the said primary piston valve, the air supply source being in communication with one end of the said primary cylinder and the auxiliary reservoir being in communication with the other end of the said primary cylinder, the said auxiliary reservoir also being in communication with a port midway between the ends of the said primary cylinder, the air brake cylinder being in communication with a secondary port midway between the ends of the said cylinder, the enlarged annular areas on the said piston valve adapted, upon movement of the said piston valve, to establish a communication channel between the said auxiliary reservoir port and the said brake cylinder secondary port, a pair of exhaust ports in communication with the said primary cylinder and valve means associated with one of the said exhaust ports, a by-pass formed in the said primary piston valve so as to enable air from the brake cylinder port to flow therethrough past one of the enlarged annular areas and communicate with one of the said exhaust ports when the said primary piston valve is in appropriate position, the said primary piston valve being subject to actuation by variance of air pressure in the said air supply source.

4. In an air brake valve adapted to be used in connection with an air supply source, an auxiliary reservoir and a brake cylinder, a primary cylinder formed therein, a primary piston valve movably positioned in the said primary cylinder, a plurality of enlarged annular areas formed on the said primary piston valve, the air supply source being in communication with one end of the said primary cylinder and the auxiliary reservoir being in communication with the other end of the said primary cylinder, the said auxiliary reservoir also being in communication with a port midway between the ends of the said primary cylinder, the air brake cylinder being in communication with a secondary port midway between the ends of the said cylinder, the enlarged annular areas on the said piston valve adapted, upon movement of the said piston valve, to establish a communication channel between the said auxiliary reservoir port and the said brake cylinder secondary port, a pair of exhaust ports in communication with the said primary cylinder and valve means associated with one of the said exhaust ports, a by-pass formed in the said primary piston valve so as to enable air from the brake cylinder port to flow therethrough past one of the enlarged annular areas and communicating with one of the said exhaust ports when the said primary piston valve is in appropriate position, the said primary piston valve being subject to actuation by variance of air pressure in the said air supply source together with a needle valve controlling said by-pass in said primary cylinder, said needle valve having a piston formed thereon, and a spring normally holding said valve open, said piston adapted to partially close said needle valve upon an increased air pressure in said primary cylinder adjacent said air supply source.

5. In an air pressure brake, in combination with a source of air supply, auxiliary reservoir or other source of air supply and a brake cylinder, means for establishing an air channel between auxiliary reservoir and brake cylinder, when at the same time the air channel between auxiliary reservoir and air supply source is closed and also the air channel between brake cylinder and atmosphere is closed, thereby applying brake, means for establishing an air channel between air supply source and auxiliary reservoir when at the same time, the air channel between auxiliary reservoir and brake cylinder is closed and also air channel between brake cylinder and atmosphere is closed, thereby recharging auxiliary reservoir, means for establishing air channel between brake cylinder and the atmosphere, when at the same time the air channel between air supply source and auxiliary reservoir is closed and also air channel between auxiliary reservoir and brake cylinder is closed, thereby releasing brake.

6. In an air pressure brake in combination with an air supply source, an auxiliary reservoir, and a brake cylinder, means for establishing air channel between air supply source and auxiliary reservoir, means for applying brake, means for recharging auxiliary reservoir, means for releasing brake only after auxiliary reservoir is charged to a predetermined pressure, and at the same time air channel between air supply source and auxiliary reservoir is closed.

7. In an air pressure brake, in combination with a source of air supply, an auxiliary reservoir, and a brake cylinder, means for establishing air channel between air supply source and auxiliary reservoir, means for applying brake and building up air pressure in brake cylinder equal to air pressure in auxiliary reservoir, means for releasing brake when at the same time air channel between air supply source and auxiliary reservoir is closed.

8. In an air pressure brake, in combination with an air supply source, an auxiliary reservoir, and a brake cylinder, means for establishing air channel between air supply source and auxiliary reservoir, means for applying brake, means for recharging auxiliary reservoir to normal pressure when brake is at the same time set, means for releasing brake when at the same time air channel between air supply source and auxiliary reservoir is closed.

HARRY J. SHERRILL.